United States Patent

Pacchione et al.

(10) Patent No.: US 9,061,377 B2
(45) Date of Patent: Jun. 23, 2015

(54) JOINING APPARATUS FOR JOINING STRUCTURAL COMPONENTS OF AN AIRCRAFT

(71) Applicant: Airbus Operations GmbH, Hamburg (DE)

(72) Inventors: Marco Pacchione, Hamburg (DE); Matteo Pezzi, Russi (IT); Valentin Richter-Trummer, Ermesinde (PT)

(73) Assignee: Airbus Operations GmbH (DE)

( * ) Notice: Subject to any disclaimer, the term of this patent is extended or adjusted under 35 U.S.C. 154(b) by 30 days.

(21) Appl. No.: 13/633,965

(22) Filed: Oct. 3, 2012

(65) Prior Publication Data

US 2013/0086783 A1 Apr. 11, 2013

Related U.S. Application Data

(60) Provisional application No. 61/543,880, filed on Oct. 6, 2011.

(30) Foreign Application Priority Data

Oct. 6, 2011 (DE) .......................... 10 2011 114 922

(51) Int. Cl.
*B23K 20/12* (2006.01)
*B23K 37/04* (2006.01)
(Continued)

(52) U.S. Cl.
CPC ....... *B23K 37/0426* (2013.01); *Y10T 29/53978* (2015.01); *B23K 37/0217* (2013.01); *B23K 37/0535* (2013.01); *B23K 20/122* (2013.01); *B23K 2201/04* (2013.01)

(58) Field of Classification Search
CPC ...................................................... B23K 20/12
USPC ............... 228/2.1, 112.1, 44.3, 45, 47.1, 49.1
See application file for complete search history.

(56) References Cited

U.S. PATENT DOCUMENTS

| | | | |
|---|---|---|---|
| 2,398,355 A | | 4/1946 | Bristol |
| 2,472,317 A | * | 6/1949 | Sorensen et al. ................ 29/466 |
| 3,201,561 A | | 8/1965 | Damon |

(Continued)

FOREIGN PATENT DOCUMENTS

| | | |
|---|---|---|
| DE | 1527383 A1 | 2/1972 |
| DE | 19834702 A1 | 2/2000 |

(Continued)

OTHER PUBLICATIONS

U.S. Appl. No. 13/645,541, filed Oct. 5, 2012.

(Continued)

*Primary Examiner* — Devang R Patel
(74) *Attorney, Agent, or Firm* — Lerner, David, Littenberg, Krumholz & Mentlik, LLP

(57) ABSTRACT

A joining apparatus for joining together structural components of an aircraft, includes positioning means for holding the structural components to be joined in a defined desired position, in which the structural components can be fixedly joined together by means of a joining device that can be moved relative to the structural components by way of guiding means, wherein the positioning means encompass a formative frame structure that is detachably secured to the structural components to be connected along the joining edges outside in the edge area, and serves as a guiding means for the joining device movably secured hereupon.

9 Claims, 1 Drawing Sheet

(51) Int. Cl.
  *B23K 37/02*   (2006.01)
  *B23K 37/053*  (2006.01)

(56) References Cited

U.S. PATENT DOCUMENTS

| | | | |
|---|---|---|---|
| 3,229,883 A | 1/1966 | Yost | |
| 5,070,792 A | 12/1991 | Harris | |
| 5,499,451 A * | 3/1996 | Krivda et al. | 29/897.2 |
| 6,708,865 B2 * | 3/2004 | Yoshinaga | 228/112.1 |
| 6,843,328 B2 | 1/2005 | Boyl-Davis et al. | |
| 6,854,632 B1 | 2/2005 | Larsson | |
| 7,448,528 B2 * | 11/2008 | Forrest et al. | 228/112.1 |
| 7,748,592 B2 | 7/2010 | Koga et al. | |
| 7,896,216 B2 | 3/2011 | Fujimoto et al. | |
| 2003/0209586 A1 * | 11/2003 | Thompson | 228/103 |
| 2008/0029578 A1 | 2/2008 | Steel et al. | |
| 2010/0213244 A1 * | 8/2010 | Miryekta et al. | 228/112.1 |

FOREIGN PATENT DOCUMENTS

| | | |
|---|---|---|
| DE | 69712078 T2 | 12/2002 |
| DE | 102007044974 A1 | 4/2009 |
| EP | 1736271 A1 | 12/2006 |
| JP | 2007054851 A | 3/2007 |
| JP | 2009061479 A | 3/2009 |

OTHER PUBLICATIONS

Parker et al., "Portable Friction Stir Welding Technology for Aluminum Fabrication", NSRP meeting, Aug. 17-18, 2010.

Talia et al., "Constructing a Prototype Man-Portable Friction Stir Welding System", NSRP SP-7 Meeting, Aug. 17, 2010.

* cited by examiner

JOINING APPARATUS FOR JOINING STRUCTURAL COMPONENTS OF AN AIRCRAFT

CROSS-REFERENCE TO RELATED APPLICATIONS

The present application claims the benefit of the filing date of U.S. Provisional Patent Application No. 61/543,880 filed Oct. 6, 2011, the disclosure of which is hereby incorporated herein by reference.

AREA OF THE INVENTION

The invention relates to a joining apparatus for joining together structural components of an aircraft, comprising positioning means for holding the structural components to be joined in a defined desired position, in which the structural components can be fixedly joined together by means of a joining device that can be moved relative to the structural components by way of guiding means.

The area of application of the invention extends to aircraft construction. In order to assemble large-volume fuselages of commercial aircraft, individual structural components, such as side parts, floor parts and ceiling parts, are connected via longitudinal welds to form a single fuselage section, and subsequently joined together to form the aircraft fuselage via transverse welds. Also conceivable aside from that is for individual fuselage sections to be configured as two pieces or one piece. Each structural component consists of a substructure comprised of longitudinally running stringers and bulkheads running transverse thereto, upon which is secured the outer skin of the aircraft, which most often consists of a light sheet metal. The individual structural parts are usually joined together by riveting.

BACKGROUND OF THE INVENTION

Known from DE 198 34 702 A1 is a joining device for connecting structural components, in which the structural components are interconnected with a riveting machine as the joining device. The joining device is provided especially for connecting transverse seams between two fuselage sections. As an outer part, the riveting machine exhibits a guide that is annularly arranged around the fuselage section and can be shifted in the longitudinal direction. Provided inside the fuselage section is an inner part of the riveting machine, which exhibits a support that can move in the longitudinal direction, and accommodates a multiaxially controlled riveting robot, wherein each working position within the structural component can be computer-actuated via the interaction between the support and riveting robot.

This joining device from prior art is geared toward the use of rivets as the connecting means, and requires that device parts be precisely positioned both inside the structural component and outside the structural component, which involves a high outlay in terms of production technology.

BRIEF SUMMARY OF THE INVENTION

An aspect of the present invention provides a joining device for connecting structural components of an aircraft, which uses a simple structural design to reliably position the structural components to be connected, and is suitable for alternative joining procedures.

An aspect of the invention includes the technical instruction based upon which the positioning means encompass a formative frame structure that is detachably secured to the structural components to be connected along the joining edges outside in the edge area, and serves as a guiding means for the joining device movably secured hereupon.

An advantage of the solution according to an aspect of the invention lies in particular in the fact that the positioning means for the structural components simultaneously also comprise the guiding means for the joining device in a functionally integrated manner. The frame structure according to an embodiment of the invention is positioned along the joining edges in a space-saving manner and specifically situated in the region in which the adjacent structural components are also connected, thereby making it possible to achieve a very precise alignment of the structural parts to be interconnected. There is no need for the manual positional corrections that must often be made when riveting. The highly precise positioning of the two structural components to be interconnected offers the precondition for using alternative joining procedures, e.g., friction stir welding, for fixedly connecting the structural components. The precondition for this is that the outer skin of the structural components consists of a light metal, preferably aluminum.

In friction stir welding, the frictional energy is generated via the wear-free rotation of the rotating tool. The rotating tool is pressed with a high force into the joining gap between the structural parts to be interconnected, and at least one tool shoulder comes to abut against the component surface. The friction between the at least one tool shoulder and joining partners causes the material under the shoulder to heat up to just under the melting point. This temperature rise leads to a drop in strength, as a result of which the material is plasticized, and the joining zones can be mixed. Initiating a feed motion along the joining edges prompts the rotating tool to continue moving while exerting a high contact force. The pressure gradient between the front and rear side of the tool caused by the feed motion and its rotational movement transport the plasticized material around the tool, which there mixes together and forms the welded seam.

The joining means designed as such a welding device is preferably equipped with a bobbin tool known in the art as the tool for friction stir welding. The bobbin tool has two opposing tool shoulders that simultaneously act on both work piece surfaces. This permits the exclusion of a counter bracket, which must otherwise be provided on the side of the work piece lying opposite the tool shoulder. Such a bobbin tool makes it possible to weld the structural components to be interconnected using a joining means situated only on a work piece side, here preferably the outside of the structural component. Accordingly, the frame structure according to an embodiment of the invention also acts on the outside of the structural components, so as to position the latter relative to each other for the joining process.

In a preferred embodiment, the frame structure is comprised of essentially straight longitudinal members running along the structural components as well as cross members that run transverse thereto and are tailored to the shape of the fuselage cross section. The longitudinal members are also tailored to the shape of the fuselage, and essentially straight, i.e., are not or only slightly curved. Since the longitudinal members can be more than 10 meters long in practice, it is proposed that the latter be divided into smaller segments if needed, so as to simplify handling and positioning.

The longitudinal members and cross members preferably exhibit a flat or L-shaped cross section. Given an L-shaped cross member, it is proposed that the latter preferably be positioned in such a way relative to joining edges of the structural components allocated to each other as to yield a joint U-shaped cross section in the assembled state. This U-shaped cross section ensures a high stability for the frame structure on the one hand, and can serve as a guide for a joining means placeable therein on the other, so as to precisely guide the latter in the feed direction relative to the joining edges allocated to each other. However, it is also conceivable to design the longitudinal member and cross member with other cross sectional shapes, provided they are suitable both in terms of providing a sufficient stability for the frame structure and an appropriate base for the joining means interacting therewith.

In order to increase the stability of the two longitudinal members or cross members situated adjacent to each other along the joining edges, it is proposed that the latter be fixed in place with each other by means of at least one transverse strap or the like. This compensates for transverse forces of up to 10,000 Newtons, which can arise during the joining process, thereby preventing the joining gap between the two allocated joining edges from widening due to these high transverse forces that result from the production technique. As a consequence, the transverse straps, which can be spaced equidistantly apart along longitudinal members and cross members, represent a simple and effective way to increase the stability of the frame structure in the joining process, i.e., preferably during friction stir welding by means of a bobbin tool.

In order to mount the longitudinal member and cross member on the structural components, they are detachably joined with the allocated structural component by means of various screw connections. The openings introduced into the structural components for this purpose can be used for rivet joints or the like after removing the frame structure. The large structural component is moved into the desired position by the frame structure according to the invention, wherein the frame structure ensures that the tolerances are exceedingly small. Initially spaced apart when mounted, the screw connections between the longitudinal member or cross member and the structural component serve as a temporary fixing means, so as to bring the structural component into the desired position, i.e., tailor it to the shape of the frame structure.

Additionally or alternatively, vacuum means can be used for fixation purposes according to another aspect of the invention. To this end, suction cups can be secured to the longitudinal member and cross member, which fix the structural components in place, if at all possible along the entire length of the longitudinal member or cross member. These vacuum suction means make it possible to generate a connection force between the frame structure and structural components to be interconnected that is high enough to weld the structural components to be interconnected in the desired position.

According to another aspect of the invention, it is proposed that the structural components overlap the frame structure on the edges in the assembled state or be oversized, and that it be possible to cut them to their finished dimensions using a separating device movably secured thereupon prior to joining. The advantage to this is that the fabricated structural components can be larger and exhibit initially higher tolerances in terms of their dimensions, wherein actual tailoring to final dimensions only takes place in a mounted state on the frame structure. As a result, the structural components can be tailored very precisely.

According to yet another measure of the invention, it is proposed that the separating device for tailoring the structural components be designed as a modular constituent of the joining device. In this regard, both devices can be realized with a single machine, which can be moved along the guide formed by the longitudinal member and cross member. As an alternative, however, the separating device and joining device can be designed as separate machines, which each can be placed in the guides formed by the longitudinal member and cross member, and changed out as a function of the work task.

BRIEF DESCRIPTION OF THE DRAWINGS

Additional aspects of the invention will be illustrated in greater detail below in conjunction with the description of a preferred exemplary embodiment of the invention based on the figures. Shown on.

DETAILED DESCRIPTION

Figure 1:
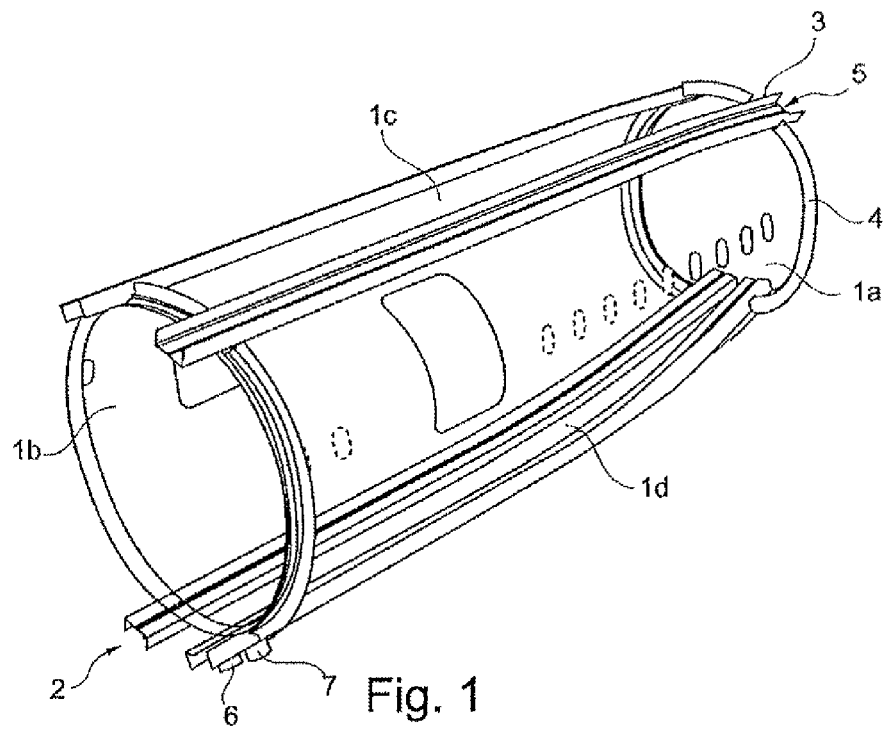
FIG. 1 is a schematic, perspective view of structural components of an aircraft fuselage provided with a frame structure.

According to FIG. 1, a fuselage section of an aircraft consists of a first structural component 1a as the first side section, a second structural component 1b as a second side section, a third structural component 1c as a ceiling section, and a fourth structural component 1d as a floor section. In this exemplary embodiment, all structural components 1a to 1d are designed as curved fuselage shells.

Structural components 1a to 1d are held in the defined desired position by positioning means that encompass a frame structure 2. The frame structure 2 consists of essentially straight, i.e., only slightly curved, longitudinal members 3 that run along the structural components 1a to 1d, and cross members 4 that run transversely hereto and are adjusted to the shape of the fuselage cross section (exemplary). Outside in the edge area of the structural components 1a to 1d, the longitudinal members 3 and cross members 4 are detachably secured along joining edges 5 here exemplarily present for the area of the longitudinal members 3, so as to hold the structural components 1a to 1d in the defined desired position for subsequent assembly.

In addition, the frame structure 2 comprised of longitudinal members 3 and cross members 4 also serves as a guiding means for a joining device 6 moveably secured hereupon. The structural components 1a to 1d overlap the frame structure 2 on the edges in the assembled state. A separating device 7 movably secured on the frame structure 2 cuts the structural components 1a to 1d to their finished dimensions prior to joining, so that a dimensionally stable connection can subsequently be established between the structural components 1a to 1d by means of the joining device 6. In this exemplary embodiment, the separating device 7 is a modular constituent of the joining device 6.

Figure 2:
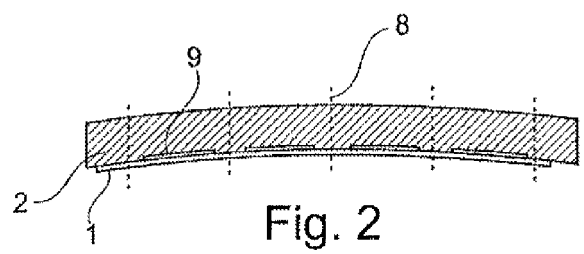
FIG. 2 is a schematic side view of a longitudinal member fixed on a structural component.

According to FIG. 2, the exemplary longitudinal member 3 of the frame structure depicted here is detachably fixed to the structural component 1 by means of screw connections 8 that are spaced apart from each other. In this way, the structural component 1 is moved into the desired position prescribed by the longitudinal member 2. In addition, the structural components 1 are held on the longitudinal member 2 by vacuum means 9, so as to apply a higher attachment force.

Figure 3:
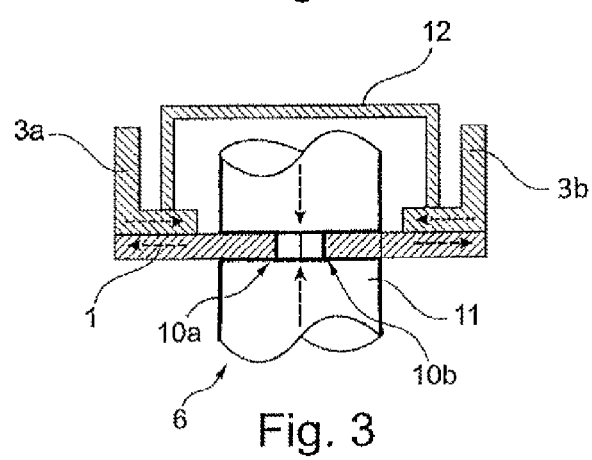
FIG. 3 is a schematic cross sectional view through a frame structure applied onto adjacent structural parts.

According to the schematic view on FIG. 3, the longitudinal member 3 exemplarily depicted here exhibits an L-shaped cross section. In the mounted state, adjacent longitudinal members 3a and 3b form a U-shaped cross section via the joining edges 10a or 10b allocated to each other. The joining device 6 is guided herein in the feed direction. In this exemplary embodiment, the joining device 6 is designed as a welding device. The welding device encompasses a bobbin tool 11 as the tool. In the process of friction stir welding with the bobbin tool 11, the joining edges 10*a* and 10*b* are also exposed to transverse forces, which are compensated by means of a transverse strap 12.

The invention is not limited to the preferred exemplary embodiment described above. Rather, modifications thereof are also conceivable, and are also encompassed by the protective scope of the following claims. For example, it is also possible for the strap used to absorb the transverse forces to be a constituent of the joining device 6 and/or separating device 7. Furthermore, in addition to a joining device 6 or separating device 7, use can also be made of a similarly movable polishing device, coating device or sensor device in conjunction with the guiding means according to the invention, for example.

In addition, let it be noted that "encompass" does not preclude any other elements or steps, and "an" or "a" do not rule out a plurality. Let it further be noted that the features or steps described with reference to one of the above exemplary embodiments can also be used in combination with other features or steps of other exemplary embodiments described above. References in the claims are not to be construed as a limitation.

REFERENCE LIST

1 Structural component
2 Frame structure
3 Longitudinal member
4 Transverse member
5 Joining edge
6 Joining device
7 Separating device
8 Screw connection
9 Vacuum suction means
10 Joining edge
11 Bobbin tool
12 Transverse strap

The invention claimed is:

1. A joining apparatus for joining together a plurality of structural components of an aircraft, comprising:
  a frame structure comprising:
    a first and a second substantially straight longitudinal members running along a first and a second of the plurality of structural components, respectively; and
    a plurality of cross members running transverse to the first and second longitudinal members and tailored to the shape of a fuselage cross section; and
  a joining device for fixedly joining together the plurality of structural components,
  wherein the frame structure is configured to be detachably secured to the plurality of structural components, and to guide the joining device;
  wherein the first longitudinal member comprises a first L-shaped cross-section and the second longitudinal member comprises a second L-shaped cross-section, and
  at least one transverse strap contacting the first L-shaped cross-section and the second L-shaped cross-section such that both L-shaped cross-sections and the transverse strap form an arrangement to movably guide the joining device therein along joining edges of the first and second structural components.

2. The joining apparatus of claim 1, wherein the joining device is configured as a welding device.

3. The joining apparatus of claim 2, wherein the joining device comprises a bobbin tool for friction stir welding.

4. The joining apparatus of claim 1, wherein at least one of the longitudinal members and cross members are detachably joined with the allocated structural component by a plurality of screw connections spaced apart from each other.

5. The joining apparatus of claim 1, wherein the longitudinal members and cross members are detachably joined with the allocated structural component by vacuum suction means secured thereto.

6. The joining apparatus of claim 1, wherein the plurality of structural components overlaps the frame structure on the edges in the assembled state or are oversized, and are configured to be cut to their finished dimensions prior to joining using a separating device movably secured thereupon.

7. The joining apparatus of claim 6, wherein the separating device is a modular constituent of the joining device.

8. The joining apparatus of claim 1, wherein the structural component is configured as a fuselage section resembling a hollow cylinder or a curved fuselage shell.

9. The joining apparatus of claim 1, wherein the first L-shaped cross-section and the second L-shaped cross-section cooperatively define a U cross-section such that the joining edges of the first and second structural components lie between said L-shaped cross-sections.

\* \* \* \* \*